US006197357B1

(12) United States Patent
Lawton et al.

(10) Patent No.: US 6,197,357 B1
(45) Date of Patent: *Mar. 6, 2001

(54) REFINED VEGETABLE OILS AND EXTRACTS THEREOF

(75) Inventors: Carl W. Lawton, Chelmsford; Robert Nicolosi; Stephen McCarthy, both of Tyngsboro, all of MA (US)

(73) Assignee: University of Massachusetts, Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,140

(22) Filed: May 28, 1998

(51) Int. Cl.[7] ..................................................... A23D 9/02

(52) U.S. Cl. ...................... 426/330.6; 426/417; 426/490; 426/601

(58) Field of Search .................................. 554/195, 8, 9; 426/417, 601, 330.6, 490

(56) References Cited

U.S. PATENT DOCUMENTS

| | | | | |
|---|---|---|---|---|
| 1,147,392 | * | 7/1915 | Hagemann | 554/195 |
| 1,885,281 | * | 11/1932 | Newton | 554/195 |
| 2,902,501 | * | 9/1959 | Clayton | 426/601 |
| 3,852,504 | | 12/1974 | Mihara et al. | 426/373 |
| 4,275,089 | * | 6/1981 | Kopas | 426/601 |
| 4,612,187 | | 9/1986 | Iijima et al. | 424/16 |
| 4,816,189 | * | 3/1989 | Rothbart | 554/195 |
| 5,084,289 | | 1/1992 | Shin et al. | 426/330.6 |
| 5,128,162 | * | 7/1992 | Wrezel | 426/417 |
| 5,175,012 | | 12/1992 | Shin et al. | 426/542 |
| 5,288,902 | | 2/1994 | Taniguchi et al. | 562/478 |
| 5,514,398 | | 5/1996 | Imai et al. | 426/271 |
| 5,552,167 | | 9/1996 | Taylor et al. | 426/99 |
| 5,653,966 | | 8/1997 | Bertoli et al. | 424/69 |

FOREIGN PATENT DOCUMENTS

| | | | | |
|---|---|---|---|---|
| 743977 | * | 10/1966 | (CA) | 426/417 |
| 0 797 984 A2 | | 10/1997 | (EP) | 7/48 |
| 816792 | * | 7/1959 | (GB) | 554/195 |
| 32-4895 | | 7/1957 | (JP) . | |

OTHER PUBLICATIONS

Stechen 1968 The Merck Index 8th Ed. Merck & Co Inc Rahway NJ p 954, 956, 65, 852, 960.*

Akiya, "Components of Unsaponifiable Matter of Rice Bran Oil", *Agr. Biol. Chem.*, 26:180–186, 1962.

de Deckere et al., "Minor Constituents of Rice Bran Oil as Functional Foods", *Nutrition Reviews*, 54:s120–s126, 1996.

El–Khalafy, "Refining of Egyptian Rice Ban Oil for Edible Purposes", *Grasas y Aceites*, 22:12–19, 1971.

Food and Agriculture Organization of the United Nations et al., "Dietary Fats and Oils in Human Nutrition", *FAO Food and Nutrition Series*, No. 20:45–54, 1980.

Hammond, "Oat Lipids", *Lipids in Cereal Technology*, 331–352, 1983.

Kiribuchi, et al., "Hypocholesterolemic Effect of Triterpene Alcohols with Soysterol on Plasma Cholesterol in Rats", *J. Nutr. Sci. Vitaminol.*, 29:35:43, 1983.

Kirk–Othmer, "Fats and Fatty Oils", Encyclopedia of Chemical Technology, (3d ed.) 9:810–830, 1980.

Moreau et al., "Extraction and Quantitative Analysis of Oil from Commercial Corn Fiber", *J. Agric. Food Chem.*, 44:2149–2154, 1996.

Nicolosi et al., "Rice Bran Oil Lowers Serum Total and Low Density Lipoprotein Cholesterol and apo B Levels in Non-human Primates", *Atherosclerosis*, 88:133–142, 1991.

Rong et al., "Oryzanol Decreases Cholesterol Absorption and Aortic Fatty Streaks in Hamsters", Lipids, 32:303–309, 1997.

Rukmini et al., "Nutritional and Biochemical Aspects of the Hypolipidemic Action of Rice Bran Oil: A Review", *Journal of The American College of Nutrition*, 10:593–601, 1991.

Sakamoto et al., "Effects of γ–Oryzanol and Cycloartenol Ferulic Acid Ester on Cholesterol Diet Induced Hyperlipidemia in Rats", *Japan J. Pharmacol.*, 45:559–565, 1987.

Sasaki et al., "Effects of Gamma–Oryzanol on Serum Lipids and Apolipoproteins in Dyslipidemic Schizophrenics Receiving Major Tranquilizers", *Clin. Ther.*, 12:263–268, 1990.

Seetharamaiah et al., "Oryzanol Content of Indian Rice Bran Oil and Its Extraction from Soap Stock", *Journal of Food Science and Technology*, 23:270–273, 1986.

Seitz, "Stanol and Sterol Esters of Ferulic and p–Coumaric Acids in Wheat, Corn, Rye, and Triticale," *J. Agric. Food Chem.*, 37:662–667, 1989.

Shinomiya et al., "Effects of γ–Oryzanol on Lipid Metabolism in Rats Fed High–Cholesterol Diet", *J. exp. Med.*, 141:191–197, 1983.

Strecker et al., "Quality Characteristics and Properties of the Principal World Oils When Processed by Physical Refining", Proceedings of the World Conference on Emerging Technologies in the Fats and Oils Industry, *American Oil Chemists Society*, 51–55, 1986.

Sullivan et al., "Refining of Oils and Fats", *J. Am. Oil Chemists' Society*, 45:564A–615A, 1968.

(List continued on next page.)

*Primary Examiner*—Carolyn Paden
(74) *Attorney, Agent, or Firm*—Fish & Richardson P.C.

(57) ABSTRACT

A method of producing unsaponifiable rich refined vegetable oils by refining crude vegetable oils with a weak acid salt, e.g., a carbonate salt, to produce a refined vegetable oil and a soapstock is described. The refined oil can be further refined with a strong base to produce unsaponifiable rich concentrates.

48 Claims, No Drawings

OTHER PUBLICATIONS

Takeshita, "Vegetable Oils and Fats", *JETRO Manufacturing Technology Guide*, 1:17–25, 1980.

Takeshita, "Technical Advances in Rice–Bran Oil Processing", *Transactions of Kokushikan Univ. Dept. of Engineering*, 5:1–23, 1972.

Tanaka et al., "Isolation of Methyl Ferulate From Rice Bran Oil", *J. Am. Oil Chemists' Society*, 48:95–97, 1971.

Thomas, "Fats and Fatty Oils", Ullmann's Encyclopedia of Industrial Chemistry, (Wolfgang Gerhartz, ed. VCH, 5th ed.) A10:173–243.

Tsuono Rice Fine Chemicals Co., Ltd., "Rice Bran Oil Extends Shelf Life", *Food Engineering*, Oct. 30, 1991.

Yoshino et al., "Effects of Gamma–Oryzanol on Hyperlipidemic Subjects", *Current Therapeutic Research*, 45:543–550, 1989.

* cited by examiner

REFINED VEGETABLE OILS AND EXTRACTS THEREOF

FIELD OF THE INVENTION

The invention relates to methods for producing refined edible oils such as vegetable oils, and extracts thereof.

BACKGROUND OF THE INVENTION

Vegetable oils have a variety of uses as food constituents and cooking aids, and are typically refined before use. Crude vegetable oils are generally refined to remove free fatty acids and other undesirable components by one of two broad methods, chemical and physical refining. Chemical refining is most commonly accomplished by the use of caustic refining compounds, such as by treating a crude oil with a sodium hydroxide solution. Physical refining is commonly accomplished by distillative neutralization, in which the free fatty acids are removed by water vapor.

Many vegetable oils degrade over time when left in contact with oxygen. Degradation can be slowed by adding one or more antioxidants to the oil. Common synthetic antioxidants include butylated hydroxytoulene (BHT), butylated hydroxyanisole, tertiary butylated hydroquinone, and propyl gallate. However, many consumers prefer natural antioxidants, such as tocopherals (vitamin E), tocotrienols, ferulates, e.g., gamma oryzanol, and sulfur-containing amino acids. These natural antioxidants are present in many crude oils, but are typically removed along with the free fatty acids during standard refining methods. Tocotrienols, ferulate esters of triterpene alcohols, e.g., gamma oryzanol, and ferulates are unsaponifiables with cholesterol-lowering properties.

SUMMARY OF THE INVENTION

The invention is based on the discovery that by treating a crude vegetable oil, e.g., an oil of plant origin, with a weak acid salt, the resulting oil is refined, and thus low in free fatty acids, but nevertheless retains most of the desirable unsaponifiables present naturally in the crude oil.

In general, the invention features a method of obtaining a refined vegetable oil having a high level of unsaponifiables and a low level of free fatty acids, and the refined vegetable oil so produced. The method includes combining a vegetable oil with a first solution that includes a weak acid salt to produce a residue. The residue is separated from the vegetable oil to produce a refined vegetable oil, and contains a high level of free fatty acids.

The high level of unsaponifiables can be from 50% to 100% by weight, e.g., 75% to 100%, of the unsaponifiables found in the crude vegetable oil that is refined by these new methods. The unsaponifiables can include gamma oryzanol, tocotrienols, and tocopherols.

The low level of free fatty acids can be 0% to 5% by weight, e.g., 0% to 2% or 0% to 1% by weight, of the refined vegetable oil.

The first solution can have a pH between 6.0 and 11.0, e.g., between 8.0 and 8.5. The weak acid salt can be a food grade base. The weak acid salt can be derived from, for example, sodium bicarbonate, ammonium bicarbonate, or potassium bicarbonate.

The vegetable oil can be, physically refined rice bran oil, rice bran oil, corn fiber oil, corn oil, olive oil, barley oil, soybean oils, oat bran oil, canola oil, sunflower seed oil, palm oil, cashew nut oil, or dill oil.

The method can also include a preliminary extraction step in which the vegetable oil is extracted from a plant source, e.g., by a solvent. The method can also include a degumming step, e.g., by citric acid, and a deodorification step.

The invention also features a method of producing a concentrate and the concentrate so produced. The refined vegetable oil produced as above is mixed with a second solution that includes a strong acid salt. The second solution has a pH of at least 11.0. The concentrate has a high level of unsaponifiables and a low level of free fatty acids and is separated from the refined vegetable oil after the refining step. The concentrate can be separated into gamma oryzanol, tocotrienol, and tocopherol components, e.g., by column chromatography.

The concentrate's high level of unsaponifiables can be from 30% to 100%, e.g., 75% to 100%, of the unsaponifiables found in the crude vegetable oil. The concentrate's low level of free fatty acids can be between 0% and 5%, e.g., 0% to 1% or 0% to 0.5%, by weight of the refined vegetable oil. The concentrate can have less than 10% neutral oil. The strong base can be sodium hydroxide.

In another aspect, the invention features a method of preserving an edible oil. The edible oil and the refined oil produced as above are combined and mixed for a time sufficient to obtain a homogenous stabilized edible oil.

In another aspect, the invention features a method of preserving an edible oil including combining the edible oil and the concentrate produced as above.

In another aspect, the invention features a method of stabilizing a polymer and the polymer so stabilized. The polymer and the concentrate produced as above are combined to obtain a homogeneous stabilized polymer.

In another aspect, the invention features a refined oil derived from a crude vegetable oil. The refined oil has greater than 50% of the unsaponifiables naturally present in the crude vegetable oil by total weight of the refined oil. The refined oil also contains less than 5% free fatty acids by weight.

In another aspect, the invention features a concentrate derived from a crude vegetable oil. The concentrate has greater than 30% of the unsaponifiables naturally present in the crude vegetable oil. The concentrate also contains less than 5% free fatty acids by weight.

In another aspect, the invention features a method of lowering the cholesterol of a mammal by administering to the mammal a portion of the concentrate.

In another aspect, the invention features a method of lowering the cholesterol of a mammal by administering to the mammal the refined oil produced above.

A vegetable oil is any oil derived or extracted from a plant, e.g., a plant seed, bran, fruit, fiber, meal, husk, or other plant source. Thus, vegetable oil can be made from all vegetables, seeds, grains, and fruits, for example, corn, rice, barley, olive, soybean, oats, canola, sunflower, palm, cashew nut, rye, triticale, wheat, and from spices and herbs, for example, dill.

"Extracted oil" is any vegetable oil that has been physically or chemically removed or separated from its plant source. "Crude oil" is extracted oil that has not been refined. "Refined oil" is oil that has been treated to remove at least some undesirable constituents, e.g., free fatty acids, naturally present in crude oil.

Unsaponifiables include those substances frequently found dissolved in fats and oils which cannot be saponified by the usual caustic treatment, but are soluble in ordinary fat and oil solvents. Included in this group of compounds are higher aliphatic alcohols, sterols, pigments, hydrocarbons, and antioxidants such as gamma oryzanol, tocotrienols, and tocopherols.

The terms "high level of unsaponifiables," "low level of free fatty acids," and "high level of free fatty acids" are dependent on the type of oil involved, as each crude oil contains a different natural level of unsaponifiables and free fatty acids. A high level of unsaponifiables indicates a significant portion of the unsaponifiables naturally present in the crude oil, e.g., about 10% or more by weight, or about 25% or more of the naturally present unsaponifiables remain in the refined oil or concentrate after refinement. A low level of free fatty acids indicates a majority of the free fatty acids found in the crude oil are no longer present. A high level of free fatty acids indicates that a majority of the free fatty acids are present.

A weak acid salt is a salt of an acid that is weaker than free fatty acids normally found in vegetable oils and stronger than unsaponifiables. While not being limited to theory, it is believed that the mechanism of selective extraction is due to intermolecular interaction between the weak acid salt component and the free fatty acid which causes deprotonation of the free fatty acid and increases its solubility in the extractant. On the other hand, the weak acid salt does not efficiently deprotonate the unsaponifiables, which are even weaker acids, e.g., phenols, than the fatty acids, and thus remain relatively insoluble in the extractant.

A solution of a weak acid salt is typically a base solution. However, the presence of a weak acid salt in a solution of acidic pH may also be used. While the techniques detailed here are useful for refining vegetable oils in a manner to selectively remove substantially all the free fatty acids while still retaining the unsaponifiables, an even more selective process, e.g., selecting specific classes or species of fatty acids and/or unsaponifiables may be refined out by selecting more specifically the relative weakness of the acid.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The invention provides effective and economical refinement methods that produce food grade edible oils containing numerous beneficial edible oil components, such as gamma oryzanol, tocotrienols, tocopherals (vitamin E), and other unsaponifiables, at much higher concentrations than oils refined by previous methods. The resulting refined vegetable oil is significantly more stable and resistant to oxidation than are previous refined oils due to the high levels of the unsaponifiables, many of which are antioxidants.

Therefore the oil can be used in the food industry as a cooking oil, or as a component of a cooking oil. The refined vegetable oil is useful as a food component, such as in mayonnaise, margarine, crackers, and cakes, for example. The refined vegetable oil can also be used to stabilize other oils. In addition, the high levels of unsaponifiables provide cholesterol lowering micro-nutrients, and the refined oil can be useful as a dietary supplement. Once a patient who may benefit from reduced cholesterol is identified, the refined oil may be used to lower cholesterol levels by its use as a replacement for other edible oils, or by its addition to the patient's diet.

The invention also provides a process for generating a concentrate rich in of the unsaponifiable components of the vegetable oil, including gamma oryzanol, tocotrienols, tocopherals, and other antioxidants, as well as cholesterol lowering micronutrients. The concentrate can be used as an antioxidant additive for any oil, including edible oils, helping preserve the stability and shelf life of the oil. In addition, the concentrate, containing oryzanol (which inhibits cholesterol absorption) and tocotrienols (HMG CoA reductase inhibitors) could be added to margarines, mayonnaise and other food products. Furthermore, the concentrate is a natural substance, which is desirable to consumers.

Further, the concentrate can be used as a polymer additive, serving as an antioxidant and stabilizer.

The concentrate can also be used in medicinal products and health and beauty products. Gamma oryzanol, for example, is reported to have cholesterol lowering properties (See, e.g., Imai et al., U.S. Pat. No. 5,514,398; Ni Rong et al., Lipids, 32:303 (1997); Gen Yoshino et al., Curr. Therap. Res., 45:543 (1989)). Tocotrienols have also been show to have cholesterol lowering properties (See, e.g., Qureshi et al., Amer. J. of Clinical Nutrition, 53:10215 (1991)). Once a patient who may benefit from lower cholesterol levels is identified, the concentrate may be used to lower cholesterol levels by its use as a dietary supplement.

The new methods of producing an unsaponifiable rich vegetable oil have several practical advantages as well. Alkali refinement methods may saponify neutral oil, reducing the refinement yield. This undesirable saponification is increased at high temperatures and alkali concentrations.

This difficulty is largely avoided by the new methods of producing an unsaponifiable rich vegetable oil. The concentration of the weak acid salt solution is flexible, and even at high concentrations of the weak acid salt, the process largely avoids neutral oil losses due to saponification. In addition, the new methods of producing an unsaponifiable rich vegetable oil do not saponify neutral oil at elevated ambient temperatures.

Other features and advantages of the invention will be apparent from the following detailed description, and from the claims.

DETAILED DESCRIPTION

The invention features new methods of producing unsaponifiable rich refined vegetable oils, such as edible vegetable oils. The crude oil is treated with a weak acid salt. The oil and weak acid salt solution are shaken or mixed to ensure reaction. Then the oil and solution phases are separated, e.g., by centrifugation. Once separated, the residue (soapstock) and any aqueous or solvent layer from the weak acid salt are removed. The remaining portion is a refined oil. The refined oil can be used in this form or treated further with a strong base to produce a concentrate rich in antioxidants and/or cholesterol lowering micronutrients.

Refinement Methods

Starting Materials

The new methods of producing unsaponifiable rich refined vegetable oils can be used to effectively refine a wide variety of crude oils. Vegetable sources of oil include, for example, oils extracted from plant seeds, bran, fruit, fiber, meal, husk, or other plant sources. Non-limiting examples of some suitable vegetable oils include oils extracted from corn, rice, barley, olive, soybean, oats, canola, sunflower, palm, cashew nut, rye, triticale, wheat, or from spices and herbs.

A crude vegetable oil is first extracted from its source. Suitable extraction methods are well known in the art, and include physical and chemical extraction methods, e.g., as described in Ullmann's Encyclopedia of Industrial Chemistry (Wolfgang Gerhartz, ed., VCH, 5th ed.) Vol. A10, §4.1.3-4, pg. 192. Nearly any method of extraction can be used to provide a crude vegetable oil for the new methods of producing unsaponifiable rich refined vegetable oils. For example, hexane extraction is commonly used in industry.

Extraction can be performed immediately prior to the new refinement methods, or extracted oil can be purchased for use in the new refinement methods.

It may also be desirable to perform other steps in addition to extraction either before or after the new refinement methods. For example, crude oil is commonly degummed or deodorized (See e.g., Ullmann's Encyclopedia of Industrial Chemistry, Vol. A10, §5, pg. 199).

The new refinement methods can also be used with oils that have been partially refined, as long as a part of the oil's unsaponifiable portion remains in the oil sample. For example, rice bran oil can be physically refined before being treated by the new refinement methods.

Refinement

Crude vegetable oils are refined as follows. The crude vegetable oil is optionally diluted with hexane or another suitable solvent such as, for example, another aliphatic hydrocarbon solvent, e.g., heptane, or supercritical propane. In some situations dilution makes the crude oil easier to handle. However, dilution requires additional expense and solvent removal apparatus, and is thus undesirable for some refining plants.

The solvent and crude oil can be mixed in widely varying ratios, depending on the circumstances. The solvent and crude oil can be mixed in any ratio from 0% solvent to nearly 100% solvent (such as directly from extraction). Preferably the solvent content is not above 50%, e.g., between 0–10%. The optimum level will depend on the volume of the sample to be refined and the type and viscosity of the oil.

The crude oil or solvent/crude oil mixture is then treated with a weak acid salt solution. The weak acid salt solution can have pH between 7.0 and 11.0, preferably between 7.5 and 9.5, e.g., 8.3. Alternatively, a solution comprising a base and a pH lowering agent, such as HCl, can be used. The solution can have a pH below 7.0 and will still refine the oil. However this solution will not be as efficient. Suitable weak acid salts include, for example, salts derived from sodium bicarbonate, ammonium bicarbonate, and potassium bicarbonate. A food grade base is preferred, e.g., food grade sodium bicarbonate, when the oil is to be used for food purposes.

The weak acid salt solution can be aqueous, or, an anion exchange resin may be used instead of a solution. The concentration of the weak acid salt solution can be varied. For example, a sodium bicarbonate solution can range from a very dilute solution, e.g., less than 0.1 M, up to sodium bicarbonate's solubility, which is about 1.9 M at 250° C. Similarly, potassium bicarbonate solutions can range from very dilute solutions, e.g., less than 0.1 M, to about 3.57 M at 250° C.; and ammonium bicarbonate solutions can range from very dilute solutions, e.g., less than 0.1 M, to about 2.53 M at 250° C.

The optimum weak acid salt solution concentration will depend on the quality of the crude oil and the desired product. Higher weak acid salt concentrations use less solvent and are more easily stored due to smaller volume. They can be preferred for economical and efficiency purposes. Even a highly concentrated weak acid salt solution will not saponify neutral oil, and is therefore safe to use. While a weak acid salt solution of any concentration can be used, concentrations between, 0.5 M and 1.5 M are effective.

The amount and concentration of the weak acid salt solution added to a volume of oil depends on the oil's free fatty acid content. The amount added typically is a slight excess of the amount required to neutralize all of the free fatty acids. The free fatty acid level is measured or calculated prior to refinement (See e.g., Ullmann's Encyclopedia of Industrial Chemistry, Vol. A10, §5.2, pg. 199, and §10.2, pg. 212; and in Frank E. Sullivan et al., J. Amer. Oil Chemists' Society 45:564A (1968)).

The first step in calculating the appropriate amount of weak acid salt is to measure or calculate the oil's free fatty acid content. The free fatty acid level can be measured, for example, by titration with phenolphthalein or with alkaline blue 6B (See Yasuhiki Takeshita, Transactions of the Kokushikan Univ. Dept. of Engineering No. 5:1 (1972)). As an alternative to titration, pre-determined values based on the average amount of free fatty acids in a specific type of oil can be used. After calculating the free fatty acid content, the appropriate amount of acid salt is calculated. One mole of acid salt is required to remove one mole of free fatty acids. Thus, a one-to-one molar ratio is the minimum amount of acid salt necessary for maximum free fatty acid refinement. A slight excess of the acid salt can be added to ensure a complete reaction.

The new methods of producing an unsaponifiable rich vegetable oil are not temperature dependent, and can be performed at ambient temperatures, even in warm climates, without significant saponification of the neutral oil.

After the weak acid salt solution is added, the weak acid salt solution and the crude oil are mixed by shaking or stirring to ensure that the weak acid salt solution and the free fatty acids react. The mixing time will vary depending on the weak acid salt solution's concentration, the strength of the weak acid salt, the oil's free fatty acid level, and the sample volume. The weak acid salt solution and the crude oil must be mixed until the free fatty acids have been sufficiently reacted and removed.

The mixture is then centrifuged for a time sufficient to remove the oil phase from the refining solution. The oil phase discharged from the centrifuge is a refined oil. When using a continuous centrifuge, the mixture is introduced into the centrifuge at a flow rate that is adjusted so that only clear refined oil comes out of the centrifuge. This refined oil is substantially free of free fatty acids. An oil sample from the discharged oil phase can be tested for free fatty acids. If the level is too high, the mixing and centrifugation times are adjusted to ensure a complete reaction. Titration, or any other suitable method, can be used to the test the oil sample.

If the refined vegetable oil is the desired product, the hexane or solvent can be evaporated before use. Depending on the desired application, further refinement steps may be appropriate, such as deodorification or degumming (See e.g., Ullmann's Encyclopedia of Industrial Chemistry, Vol. A10, §5, pg. 199). If a concentrate is desired, the hexane or solvent can be left in the refined oil or removed.

Generating a Concentrate

To generate a concentrate, the refined oil produced above is treated with a strong base solution, such as a sodium hydroxide solution. Other suitable strong bases include, for example, $NH_3$, KOH, or $Na_2CO_3$. A stronger base, e.g., NaOH , will remove a greater percentage of the unsaponifiables more quickly than will a relatively weaker base, such as $Na_2CO_3$. The refined oil can be diluted with hexane, or another suitable solvent such as, for example, another aliphatic hydrocarbon solvent, e.g., heptane or super critical propane. The solvent and oil can be mixed in any ratio from 0% solvent to nearly 100% solvent. Preferably the solvent content is not above 50%, e.g., between 0–10, 15, 20, or 25 percent.

A predetermined amount of the strong base solution is then added to the refined oil. The amount of the strong base solution added depends on the level of unsaponifiables remaining in the oil.

The total level of unsaponifiables may be determined according to AOCS official method Ca 6a-40 (1997), or AOCS Official Method Ca 6b-53 (1997).

The antioxidant level can be independently determined by titration as follows. Two samples of the same crude oil, before refinement, are prepared. The first is titrated with NaOH to determine the level of free fatty acids. Phenolphthalein is used as the indicator for this titration. The color change for phenolphthalein occurs when both the free fatty acids and the unsaponifiables are reacted, thus measuring their combined level in the oil. The NaOH reacts on a one-to-one molar ratio with both the free fatty acids and the unsaponifiables. Thus, the combined molar amount can be calculated from this titration.

The second crude oil sample is also titrated with NaOH to determine the level of free fatty acids. However, alkaline blue 6B is used as the indicator. Alkaline blue 6B changes color before the unsaponifiables react, and thus only measures the level of the free fatty acids. As above, NaOH reacts on a one-to-one molar ratio with the free fatty acids. Thus, the free fatty acid molar amount is calculated from this titration. The level of unsaponifiables in the crude oil is then determined by subtracting the free fatty acid molar amount from the combined molar amount (See Yasuhiki Takeshita, Transactions of the Kokushikan Univ. Dept. of Engineering No. 5:1 (1972)).

A slight excess over a 1 to 1 mole ratio of the strong base solution to unsaponifiables is then added to the refined oil. As an alternative to titration, a pre-determined value for the amount of unsaponifiables can be used to determine the amount of sodium hydroxide to add. These pre-determined values can be based on the average amount of unsaponifiables in the type of crude oil.

Some practical difficulties can arise when using a strong base, especially sodium hydroxide, to generate a concentrate. The temperature at which mixing occurs and the concentration of the sodium hydroxide solution are important. A concentrate will generally be produced at any ambient temperature and sodium hydroxide concentration used. However, a high temperature can result in saponification of the neutral oil by the sodium hydroxide solution, as can a high concentration of the sodium hydroxide solution. On the other hand, mixing the refined oil with a dilute sodium hydroxide solution results in some neutral oil loss due to occlusion in the soapstock.

For these reasons sodium hydroxide concentrations between 0.5 M to 1.5 M, e.g., 1.0 M, are effective.

After the strong base solution is added to the refined oil, the strong base solution and the refined oil are mixed by shaking or stirring to ensure that the strong base and the unsaponifiables react.

The mixing time varies depending on the strength of the strong base solution, the amount of unsaponifiables in the refined oil, and the volume of the sample. The mixture is then centrifuged in a continuous process. As above, the flow rate can be adjusted so that the effluent (the refined oil) is clear. To test if the mixing and centrifugation times are sufficient, a sample of the effluent can be tested for unsaponifiables by titration with phenolphthalein.

Two useful components are generated by this treatment method. The first component is a further refined oil. The further refined oil may readily be used in any application in which refined oils are currently used. Any hexane or solvent that was optionally added above is preferably removed from the refined oil before use, typically by evaporation.

The second component is a concentrate. This concentrate is rich in unsaponifiables, including antioxidants such as gamma oryzanol, vitamin E, and tocotrienols. The concentrate is a valuable source of cholesterol lowering micronutrients and antioxidants. It may be used, for example, to provide these materials for use in other oils, in polymers, or in medicinal applications. The concentrate can be treated with an acid to lower its pH to at or below approximately 11.0. A mineral acid can be used to reach a pH of 7.0 or lower. As the pH is lowered below 7.0 the equilibrium shifts towards more of the unsaponifiables being protonated and thus oil-soluble, rather than water-soluble salts.

Both the new methods of producing an unsaponifiable rich vegetable oil and the new methods of generating a concentrate are readily adaptable to various types of oils. The only changes involve the amount of the weak acid salt added during refinement and the amount of the strong base added to separate the concentrate.

These two amounts are dependent on the level of free fatty acids and the level of unsaponifiables in the oil, respectively. The levels of free fatty acids and unsaponifiables are determined for a given crude oil before beginning the process. These values can be determined by titration, as described above, or by other suitable methods.

The concentrate is rich in gamma oryzanol, vitamin E, and tocotrienols. For some applications it may be useful to further separate this concentrate into purified forms of these various constituents. This may be accomplished, for example, by column chromatography.

The various components in both the refined oil and in the concentrate can be quantified, if desired, according to the procedures described in R. Moreau et al., Journal of Agricultural and Food Chemistry, 44:2149 (1996); and in E. Rogers et. al., Journal of American Oil Chemist Society, 70:301.

Applications for Refined Oil/Oil Concentrate

Refined edible oils have numerous known uses. The vegetable oils refined according to the new methods of producing an unsaponifiable rich vegetable oil can be used in place of or combined with other refined oils to fulfill any of these uses. In addition, the refined oils can be used to stabilize other oils by virtue of their high concentrations of natural antioxidants. The new refined oils can also be used to stabilize the same kind of oil (such as sodium bicarbonate refined corn oil added to sodium hydroxide refined corn oil). This can avoid the effects on the subtle flavors and tastes of the stabilized oil caused by adding one form of antioxidant rich oil (such as rice bran oil) to another type of oil (such as olive oil).

The concentrate can also be used to provide an economical source of natural antioxidants. The addition of the concentrate to an edible oil will not substantially impact the flavor of the oil. The concentrate can be used in any application requiring added antioxidants. For example, the concentrate can be added to polymer compositions to inhibit oxidative degradation and preserve the useful shelf life. In some applications the antioxidant added must be a food grade antioxidant. For example, the polymers used in construction of medical devices and drinking containers must contain only additives that are safe for humans. The concentrate is suitable for these applications, and can be added in any ratio of concentrate to polymer, e.g., from 0.1% to 10% concentrate, depending on the applications requirements.

The concentrate, or its components, can also be used in medicinal applications. Gamma oryzanol, for example, is a cholesterol lowering agent (See, e.g., Imai et al., U.S. Pat. No. 5,514,398), as are tocotrienols, and can be used to treat hyperlipidemic subjects or to lower cholesterol levels.

The invention is further described in the following examples, which do not limit the scope of the invention described in the claims.

EXAMPLES

Example 1

Alkaline Refinement of Crude Rice Bran Oil (CRBO) and Crude Corn Fiber Oil (CCFO)

The first example was designed to test the level of gamma oryzanol that remained in the refined oil after treatment by different refining agents. The level of gamma oryzanol remaining in the oil was tested by measuring its level in the refined oil.

At room temperature, 26° C., two grams of CRBO were added to each of four labeled screw cap tubes. Then, two grams of CCFO were added to each of four different labeled screw cap tubes. Two ml of $H_2O$, 1 M $NaHCO_3$, 0.5 M $Na_2CO_3$, and 1 M NaOH were added to the CRBO and to the CCFO, one to each of the separately labeled tubes. The cap was screwed on and each tube was shaken vigorously for one minute. After centrifugation in the tube at 2000 rpm for five minutes, 0.2 ml of the top oil layer was removed and placed in separate labeled tubes. This layer was the refined oil.

Analysis: Ten ml of hexane was added to the refined oil and mixed. The hexane oil mixture was injected for analysis by HPLC. HPLC conditions were as follows:

Column: LiChrosorb DIOL, 5 μm (4.6×250 mm)

Mobil Phase: Hexane: 2-propanol:acetic acid (99:0.9:0.1)

Detector: uv @315 nm

The results are expressed as the percentage of γ-oryzanol remaining in the oil:

| | Corn Fiber Oil | Rice Bran Oil |
|---|---|---|
| $H_2O$ | 8.12% | 2.55% |
| $NaHCO_3$ | 8.12% | 2.55% |
| $Na_2CO_3$ | 6.78% | 2.14% |
| NaOH | 0.21% | 0.12% |

The results indicate the level of gamma oryzanol that remained in the refined oil after the refinement process. A higher value indicates a more stable refined oil containing more gamma oryzanol. NaOH refinement removed nearly all of the gamma oryzanol from the refined oil. $Na_2CO_3$ refining removed a smaller amount of antioxidants, providing a more desirable refined oil, but still experienced a significant loss. $NaHCO_3$ and $H_2O$ refinement provided the most desirable refined oil with the largest antioxidant level.

Example 2

Alkaline Refinement of Crude Rice Bran Oil (CRBO)

This example measured the levels of gamma oryzanol and free fatty acids that remained in the refined oil after treatment with the different refining agents.

Six grams of CRBO were added to each of eight labeled Erlenmeyer flasks. 25 ml of 1 M $NaHCO_3$, 0.5 M $Na_2CO_3$, 1 M NaOH, and $H_2O$ were added the CRBO, each reagent into two Erlenmeyer flasks. The flasks were sealed. Four flasks, one for each reagent, were shaken at 100 rpm on a rotary shaker for five minutes. The other four flasks were shaken on the rotary shaker for 24 hours. After shaking, the oil mixtures were transferred to tubes and centrifuged at 2000 rpm for five minutes.

0.1 ml of the top oil layer was removed from the centrifuged tubes and placed in a first set of labeled tubes for HPLC assay of the gamma oryzanol. Five grams of the top oil layer were removed from the centrifuged tubes and placed in a second set of labeled tubes for assay of the free fatty acids remaining in the refined oil.

Gamma Oryzanol Analysis: 0.9 ml of hexane was added to each of the tubes in the first set of labeled tubes. The hexane and oil were then mixed. The hexane oil mixture was injected for analysis by HPLC. The HPLC conditions were as follows:

Column: LiChrosorb DIOL, 5 μm (4.6×250 mm)

Mobil Phase: Hexane: 2-propanol:acetic acid (99:0.9:0.1)

Detector: uv @315 nm

The results are expressed as the percentage of γ-oryzanol remaining in the oil:

| | 5 minute extraction | 24 hour extraction |
|---|---|---|
| $H_2O$ | 2.55% | 2.55% |
| $NaHCO_3$ | 2.55% | 2.55% |
| $Na_2CO_3$ | 2.14% | 1.52% |
| NaOH | 0.12% | — |

Free Fatty Acid Content Analysis: Four solutions of 95% ethanol were prepared as follows: 50 ml of the 95% ethanol was placed in a flask. The solutions were then neutralized by adding 0.2 mg of Alkali Blue 6B (Aldrich 39,532-3). Next, 0.1 N NaOH was added until a permanent red color was produced.

One of each of the above prepared ethanol solutions was added to each of the second set of labeled tubes. This solution was then titrated with 0.25 N NaOH in the presence of constant stirring. The titration continued until a permanent red appeared for one minute or longer. The results are calculated as a percentage of free fatty acids remaining in the refined oil.

| | 5 minute extraction | 24 hour extraction |
|---|---|---|
| $H_2O$ | 3.7% | 3.7% |
| $NaHCO_3$ | 1.85% | 0.33% |
| $Na_2CO_3$ | 0.14% | 0.14% |
| NaOH | 0.12% | — |

The results indicate the level of free fatty acids that remained in the refined oil after the refinement process.

In the five minute extraction NaOH and $Na_2CO_3$ removed the largest percentage of free fatty acids. When allowed to react for sufficient time $NaHCO_3$ provides the best balance of free fatty acid removal and gamma oryzanol retention. While $H_2O$ leaves as much gamma oryzanol in the oil as does $NaHCO_3$, its inability to remove the free fatty acids renders it ineffective for refinement purposes.

Example 3

Alkaline Refinement of Extra Virgin Olive Oil and Oat Bran Oil

This example tested the level of gamma oryzanol removed by each refining agent.

Ten ml each of extra virgin olive oil and oat bran oil were diluted with ten ml of hexane (Aldrich $98.5^+$ACS) Two ml of the diluted oil was aliquoted to six labeled fifteen ml screw cap tubes (three for each oil). 1 M $NaHCO_3$, 1 M $Na_2CO_3$, and 1 M NaOH were used as refining agents. Two ml of each refining agent was pipetted, with each refining agent being pipetted to two tubes (one tube of each type of hexane/oil solution). The cap was screwed on and the tube shaken vigorously for one minute to ensure complete reaction. The tube was then centrifuged at 2000 rpm for two minutes.

Analysis: The top hexane/oil layer was removed with a pipette and discarded. Two ml of hexane was added to the wash aqueous layer and soapstock. The cap was screwed back on and the tube was shaken vigorously for one minute. After again centrifuging at 2000 rpm for two minutes, the top hexane layer was removed and discarded. This top hexane layer contained any residual neutral refined oil not removed with the top hexane/oil layer.

At this point the tubes still contained the soapstock and aqueous layer. One ml of 5 N HCl was added to each tube to protonate the antioxidants. Eight ml of hexane were added to solvate the antioxidants. The cap was screwed back on and the tube shaken vigorously for one minute. The tube was again centrifuged at 2000 rpm for two minutes. For the olive oil, 300 $\mu l$ of the top layer was diluted with 1300 $\mu l$ with hexane. For the Oat Bran oil, 200 $\mu l$ of the top layer was diluted with 1200 $\mu l$ hexane.

The OD of the top layer was read at wavelengths corresponding to the maxima of the expected components. Olive oil does not contain appreciable amounts of gamma oryzanol, but does contain other antioxidants, thus, its OD was read at 272 nm, the corresponding maximum. The maximum for ferulated esters is in the range of 312–315 nm, so oat bran oil was read at both 312 and 278 nm.

| Results: | Sample | OD @ 272 nm |
|---|---|---|
| (olive oil) | NaOH | 0.426 |
| | $NaHCO_3$ | 0.057 |
| | $H_2O$ | 0.021 |

| Results: | Sample | OD @ 312 nm | OD @ 278 nm |
|---|---|---|---|
| (oat bran oil) | NaOH | 0.322 | 0.407 |
| | $NaHCO_3$ | 0.071 | 0.141 |
| | $H_2O$ | 0.036 | 0.094 |

The results in this example measure the level of unsaponifiables (antioxidants) that each refinement process removes from the oil when it removes the free fatty acids. A higher OD value indicates more antioxidants in the waste product, i.e., removed from the refined oil. Thus, NaOH refinement removes the highest percentage of the desirable antioxidants. Water removes the least, but, as demonstrated above in example 2, it fails to remove the free fatty acids.

Example 4

Antioxidant Properties of the Concentrate

This example measures the effectiveness of the concentrate when used as an antioxidant for various polymer formulations. To generate a concentrate, 500 ml of Crude Rice Bran Oil was mixed with 500 ml of 1 N $NaHCO_3$ to remove the free fatty acids. This mixture was shaken vigorously for one minute to ensure complete reaction, and then centrifuged at 2000 rpm for two minutes to separate out the refined oil.

The resulting refined oil was then mixed with 500 ml of 1 N NaOH. This mixture was shaken vigorously for one minute to ensure complete reaction, and then centrifuged at 2000 rpm for two minutes to collect the solids. The solids were acidified with 1 N HCl. Then 500 ml of hexane was added to solubilize the antioxidants. This solution was again centrifuged to separate out the hexane layer. The hexane was evaporated to generate the concentrate.

Using this concentrate, test formulations are prepared as shown in Table 1, below.

TABLE 1

| Polymer | Concentrate (by % concentrate by weight) | | | | |
|---|---|---|---|---|---|
| Linear Low Density Polyethylene | 0.0% | 0.1% | 0.5% | 1.0% | 5.0% |
| Polypropylene | 0.0% | 0.1% | 0.5% | 1.0% | 5.0% |
| Polyethylene Terephthalate | 0.0% | 0.1% | 0.5% | 1.0% | 5.0% |

Additional test formulations are prepared with Vitamin E added to determine any synergistic antioxidation effect between the Vitamin E and the concentrate. Pure polymers without added concentrate or Vitamin E serve as a control.

The concentrate and the polymer, or the concentrate, polymer, and Vitamin E blend are melt blended in a single screw extruder. The blending temperature depends on the polymer used. The polyethylene is blended at 400° F. The polypropylene is blended at 450° F. The PET is blended at 550° F. After blending, each formulation is extruded into films approximately 0.005 inches thick and allowed to cool to room temperature before testing.

The films are then tested as follows:

1) FTIR: This test measures the IR transmission of the C═O double bond peak. A film prepared according to each of the above formulations is tested at different points in time after its formation. The peak height of the C═O bond will be reduced as the film is oxidized over time.

2) Accelerated Sunlight Testing: Accelerated Sunlight Testing is used to measure the film's enhanced resistance to oxidation in UV radiation. The films are exposed to a high intensity light source that simulates an exterior environment. The lamps' intensity simulates in hours the effect that days of exterior exposure will have on the film. The oxidation of the films is measured by FTIR at various points in time as in the FTIR test.

3) Oxidative Induction Time by Differential Scanning Calorimetry (DSC): Each blend is measured for the Oxidative Induction Time by DSC as per ASTM D 3895. The formulations (before being drawn into a film) are heated to their respective processing temperatures and exposed to pure oxygen. As the formulation is oxidized, it gives off heat. This heat is measured by DSC over time. This test measures the stability during processing. The concentrate increases the Oxidative Induction Time thereby acting as an antioxidant for thermoplastic processing. The longer the Oxidative Induction Time, the more effective the concentrate is, as the polymer can be processed longer and recycled with minimum degradation.

4) Oxygen Permeability: The extruded films can also be measured for Oxygen Permeability using a oxygen permeation apparatus for MOCON. In this test, the amount of oxygen that passes through from one side of the film to the other is measured. The concentrate and any Vitamin E act as oxygen scavengers thereby significantly reducing the oxygen permeability, which is useful for packaging materials that require a highly effective oxygen barrier.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of refining a crude vegetable oil to obtain a refined vegetable oil having a high level of at least one unsaponifiable phenolic compound and a low level of free fatty acids, the method comprising combining a crude vegetable oil comprising a high level of at least one of its naturally occurring unsaponifiable phenolic compounds with a first solution comprising a weak acid salt and mixing for a time and at ambient temperature to produce a residue containing a high level of free fatty acids; and separating the residue from the vegetable oil to produce a refined vegetable oil comprising a high level of at least one unsaponifiable phenolic compound.

2. The method of claim 1, wherein the high level of the unsaponifiable phenolic compound is from 50% to 100% of the unsaponifiable phenolic compound present in the crude vegetable oil.

3. The method of claim 1, wherein the high level of the unsaponifiable phenolic compound is from 75% to 100% of the unsaponifiable phenolic compound present in the crude vegetable oil.

4. The method of claim 1, wherein the low level of free fatty acids is from 0% to 5% by weight of the refined vegetable oil.

5. The method of claim 1, wherein the low level of free fatty acids is from 0% to 2% by weight of the refined vegetable oil.

6. The method of claim 1, wherein the low level of free fatty acids is from 0% to 1% by weight of the refined vegetable oil.

7. The method of claim 1, wherein the unsaponifiable phenolic compound comprises a gamma oryzanol, a tocotrienol, or a tocopherol.

8. The method of claim 1, wherein the first solution has a pH between 6.0 and 11.0.

9. The method of claim 1, wherein the first solution has a pH between 8.0 and 8.5.

10. The method of claim 1, further comprising, after separating and removing the residue to produce the refined vegetable oil, combining the refined vegetable oil with a second solution comprising a strong base, the second solution having a pH of at least 11.0, and mixing for a time and at a temperature sufficient to produce a concentrate; and separating the concentrate from the refined vegetable oil, wherein the concentrate contains a second high level of at least one unsaponifiable phenolic compound and a second low level of free fatty acids.

11. The method of claim 10, wherein the concentrate is less than 10% neutral oil.

12. The method of claim 10, wherein the second high level of at least one unsaponifiable phenolic compound is from 30% to 100% by weight of the concentrate.

13. The method of claim 10, wherein the second high level of at least one unsaponifiable phenolic compound is from 75% to 100% by weight of the concentrate.

14. The method of claim 10, wherein the second low level of free fatty acids is from 0% to 5% by weight of the concentrate.

15. The method of claim 10, wherein the second low level of free fatty acids is from 0% to 1% by weight of the concentrate.

16. The method of claim 10, wherein the second low level of free fatty acids is from 0% to 0.5% by weight of the refined vegetable oil.

17. The method of claim 10, wherein the strong base is sodium hydroxide.

18. The method of claim 10, further comprising the step of separating the concentrate into gamma oryzanol, tocotrienol, and tocopherol components.

19. The method of claim 10, wherein separation of the concentrate is performed by column chromatography.

20. A concentrate which is obtained by the method of claim 10.

21. A method of preserving an edible oil, the method comprising combining an edible oil and a concentrate prepared by the method of claim 10, and mixing for a time sufficient to obtain a homogenous preserved edible oil, wherein the concentrate comprises 75% of the unsaponifiable phenolic compound found in the crude vegetable oil.

22. The method of claim 1, wherein the weak acid salt is a food grade material.

23. The method of claim 1, wherein the weak acid salt is selected from the group consisting of sodium bicarbonate, ammonium bicarbonate, and potassium bicarbonate.

24. The method of claim 1, wherein the weak acid salt is sodium bicarbonate.

25. The method of claim 1, wherein separation is performed by centrifugation.

26. The method of claim 1, wherein the vegetable oil is selected from the group consisting of physically refined rice bran oil, rice bran oil, corn fiber oil, corn oil, olive oil, barley oil, soybean oils, oat bran oil, canola oil, sunflower seed oil, palm oil, cashew nut oil, and dill oil.

27. The method of claim 1, further comprising a preliminary extraction step in which the vegetable oil is extracted from a plant source.

28. The method of claim 27, wherein the preliminary extraction step is a solvent extraction.

29. The method of claim 27, wherein a portion of a solvent remains in the vegetable oil after the preliminary extraction step.

30. The method of claim 29, wherein the degumming step uses citric acid.

31. The method of claim 1, further comprising a degumming step.

32. The method of claim 1, further comprising a deodorification step.

33. A refined vegetable oil which is obtained by the method of claim 1.

34. A method of preserving an edible oil, the method comprising combining an edible oil and an oil refined by the method of claim 1 and mixing for a time sufficient to obtain a homogenous stabilized edible oil, wherein the refined oil comprises 75% of the unsaponifiable phenolic compound found in the crude vegetable oil.

35. The method of claim 34, wherein the vegetable oil is selected from the group consisting of physically refined rice bran oil, rice bran oil, corn fiber oil, corn oil, olive oil, barley oil, soybean oils, oat bran oil, canola oil, sunflower seed oil, palm oil, cashew nut oil, and dill oil.

36. The method of claim 1, wherein the crude vegetable oil is combined with the first solution at ambient pressure.

37. A method of obtaining a refined vegetable oil concentrate having a high level of at least one unsaponifiable phenolic compound and a low level of free fatty acids, the method comprising combining a vegetable oil comprising a high level of at least one of its naturally occurring unsaponifiable phenolic compounds with a first solution comprising a weak acid salt and mixing for a time and at a temperature sufficient to produce a residue containing a high level of free fatty acids;

separating the residue from the vegetable oil to produce a refined vegetable oil comprising a high level of at least one unsaponifiable phenolic compound;

combining the refined vegetable oil with a second solution comprising a strong base, the second solution having a pH of at least 11.0, and mixing for a time and at a temperature sufficient to produce a concentrate; and separating the concentrate from the refined vegetable oil, wherein the concentrate contains a second high level of at least one unsaponifiable phenolic compound and a second low level of free fatty acids.

38. The method of claim 37, wherein the second high level of at least one unsaponifiable phenolic compound is from 30% to 100% by weight of the concentrate.

39. The method of claim 37, wherein the second high level of at least one unsaponifiable phenolic compound is from 75% to 100% by weight of the concentrate.

40. The method of claim 37, wherein the second low level of free fatty acids is from 0% to 5% by weight of the concentrate.

41. The method of claim 37, wherein the second low level of free fatty acids is from 0% to 1% by weight of the concentrate.

42. The method of claim 37, wherein the strong base is sodium hydroxide.

43. The method of claim 37, further comprising separating the concentrate into gamma oryzanol, tocotrienol, and tocopherol components.

44. A method of refining a vegetable oil to obtain a refined vegetable oil having a high level of at least one unsaponifiable phenolic compound and a low level of free fatty acids, the method comprising combining a vegetable oil comprising a high level of at least one of its naturally occurring unsaponifiable phenolic compounds with a first solution comprising a weak acid salt and mixing for a time and at ambient pressure to produce a residue containing a high level of free fatty acids; and separating the residue from the vegetable oil to produce a refined vegetable oil comprising a high level of at least one unsaponifiable phenolic compound.

45. The method of claim 44, wherein the first solution has a pH of between 6.0 and 11.0.

46. The method of claim 44, wherein the low level of free fatty acids is from 0% to 2% by weight of the refined vegetable oil.

47. The method of claim 44, wherein the high level of the unsaponifiable phenolic compound is from 75% to 100% of the unsaponifiable phenolic compound present in the vegetable oil.

48. The method of claim 44, wherein the unsaponifiable phenolic compound comprises a gamma oryzanol, a tocotrienol, or a tocopherol.

* * * * *